US008199471B2

(12) United States Patent
Bemelmans et al.

(10) Patent No.: US 8,199,471 B2

(45) Date of Patent: Jun. 12, 2012

(54) ROLLABLE DISPLAY DEVICE

(75) Inventors: David J. E. Bemelmans, Eindhoven (NL); Kenny Darmadji, Delft (NL); Edzer Huitema, Veldhoven (NL); Raymond W. Lafarre, Eindhoven (NL); Nicolaas W. Schellingerhout, Eindhoven (NL)

(73) Assignee: Creator Technology B.V., Breda (NL)

( * ) Notice: Subject to any disclaimer, the term of this patent is extended or adjusted under 35 U.S.C. 154(b) by 799 days.

(21) Appl. No.: 11/576,469

(22) PCT Filed: Sep. 30, 2005

(86) PCT No.: PCT/IB2005/053234

§ 371 (c)(1), (2), (4) Date: Oct. 30, 2009

(87) PCT Pub. No.: WO2006/038171

PCT Pub. Date: Apr. 13, 2006

(65) Prior Publication Data

US 2010/0177020 A1 Jul. 15, 2010

Related U.S. Application Data

(60) Provisional application No. 60/616,096, filed on Oct. 5, 2004, provisional application No. 60/667,971, filed on Apr. 4, 2005.

(51) Int. Cl.
*G06F 1/16* (2006.01)

(52) U.S. Cl. ................... 361/679.21; 349/187; 526/418; 345/690; 455/462

(58) Field of Classification Search .................. 349/106, 349/84, 189, 187; 526/257, 219.1, 418; 345/30, 345/204, 690, 173, 174, 107, 55, 169; 361/679.3, 361/679.01, 679.04, 679.29, 679.06, 679.21, 361/679.47, 679.27, 679.33, 679.54, 749, 361/807; 235/440, 449; 455/575.3, 575.7, 455/41.5, 462; 710/62

See application file for complete search history.

(56) References Cited

U.S. PATENT DOCUMENTS

| | | | | |
|---|---|---|---|---|
| 5,128,662 | A | 7/1992 | Failla | |
| 6,311,076 | B1 | 10/2001 | Peuhu et al. | |
| 2001/0003450 | A1 | 6/2001 | Hemia et al. | |
| 2002/0070910 | A1 | 6/2002 | Fujieda et al. | |
| 2003/0144034 | A1 | 7/2003 | Hack et al. | |
| 2004/0052037 | A1 | 3/2004 | Sawyer | |
| 2006/0136622 | A1 * | 6/2006 | Rouvelin et al. | 710/62 |
| 2010/0246113 | A1 * | 9/2010 | Visser et al. | 361/679.3 |

FOREIGN PATENT DOCUMENTS

| | | | |
|---|---|---|---|
| JP | 5096848 | A | 4/1993 |
| JP | 5224302 | A | 9/1993 |

(Continued)

*Primary Examiner* — Hung Duong

(57) ABSTRACT

A rollable display device including a first housing 32; a second housing 34 mateable with the first housing 32; an electronic package 36 disposed within at least one of the first housing and the second housing 34; a roll frame 40 coupled to the first housing 32; a rollable display 38 rotatably disposed within the roll frame 40, having one end connected at the second housing 34, and operably connected to the electronic package 36 to display information from the electronic package 36; and a spreader mechanism 50 having a first leg assembly 52, a second leg assembly 54, and a joining assembly 56. First leg assembly 52 couples the first housing 32 and the second housing 34, second leg assembly 54 couples the first housing 32 and the second housing 34, and joining assembly 56 couples the first leg assembly 52 and the second leg assembly 54.

32 Claims, 10 Drawing Sheets

FOREIGN PATENT DOCUMENTS

| | | | |
|---|---|---|---|
| JP | 6235973 | A | 8/1994 |
| JP | 9216465 | A | 8/1997 |
| JP | 2001507419 | T | 6/2001 |
| JP | 2003287083 | A | 10/2003 |
| JP | 2006509249 | T | 3/2006 |
| WO | WO0020946 | | 4/2000 |
| WO | WO2004053818 | | 6/2004 |

* cited by examiner

ROLLABLE DISPLAY DEVICE

The present application claims priority to U.S. Provisional Patent Application Ser. No. 60/616,096 filed Oct. 5, 2004, incorporated herein by reference.

This invention relates generally to rollable display devices, and more specifically to rollable display devices providing an extended planar display.

Miniaturization and increased processing power has recently allowed great increases in the portability of electronics. Complex devices have been reduced to pocket size. Wherever they desire, consumers are able to carry and use such devices as cellular telephones, music players, game players, still and motion digital cameras, and GPS locators. Still, the size and form factor of the devices is often limited by the optical display because most devices currently use an inflexible glass optical display. Such displays are bulky, heavy, expensive, and fragile. Fragility increases with increasing display size, but limiting display size reduces the usefulness of the device. Content requiring high resolution, such as maps, cannot be shown on a small display.

To obtain greater portability and avoid the drawbacks of glass optical displays, rollable displays have been developed. Rollable displays are typically made of a flexible material that can be rolled about a cylinder in a housing for storage when not in use. To use the rollable display, the user pulls an exposed end of the rollable display with one hand while grasping the housing with the other hand. The rollable display unrolls to display the content desired. The very flexibility that allows the rollable display to roll into a compact shape gives rise to a problem: the user must continue to support and hold taut the rollable display to view the content. This pose is not only inconvenient, but also limits the users ability to interact with the device. Both hands are occupied, so the user cannot press buttons on the device. Design options are also limited: the rollable display cannot be a touch screen, since the user does not have a free hand to touch the screen.

Various arrangements have been proposed to hold the rollable display in the extended position for use, but stability has typically been lacking. One end of the rollable display is usually attached to an electronics package and the other end extended away from the electronics package is left unsupported or minimally supported. The extended end can easily be bent or blown about. The extended end can also be twisted, so that the axis of the electronics package end and the axis of the extended end are not parallel. Twisting makes the display hard to read due to reflection concentrated on the display and variation in viewing angle over the surface.

It would be desirable to have a rollable display device that overcomes the above disadvantages.

One aspect of the present invention provides a rollable display device including a first housing; a second housing mateable with the first housing; an electronic package disposed within at least one of the first housing and the second housing; a roll frame coupled to the first housing; a rollable display rotatably disposed within the roll frame, having one end connected at the second housing, and operably connected to the electronic package to display information from the electronic package; and a spreader mechanism having a first leg assembly, a second leg assembly, and a joining assembly. The first leg assembly couples the first housing and the second housing, the second leg assembly couples the first housing and the second housing, and the joining assembly couples the first leg assembly and the second leg assembly.

Another aspect of the present invention provides a rollable display device including a first housing; a second housing mateable with the first housing; an electronic package disposed within at least one of the first housing and the second housing; a roll frame being coupled to the first housing; a rollable display rotatably disposed within the roll frame and having one end connected at the second housing, and operably connected to the electronic package to display information from the electronic package; and a spreader mechanism having a first four-bar mechanism and a second four-bar mechanism. The first four-bar mechanism is coupled to the first housing and a joining assembly, and the second four-bar mechanism is coupled to the second housing and the joining assembly.

Another aspect of the present invention provides a rollable display device including a first housing; a second housing mateable with the first housing; means for generating a graphical information signal; rollable means for displaying graphical information responsive to the graphical information signal, the rollable displaying means providing a closing force between the first housing and the second housing; and means for spreading the first housing and the second housing.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
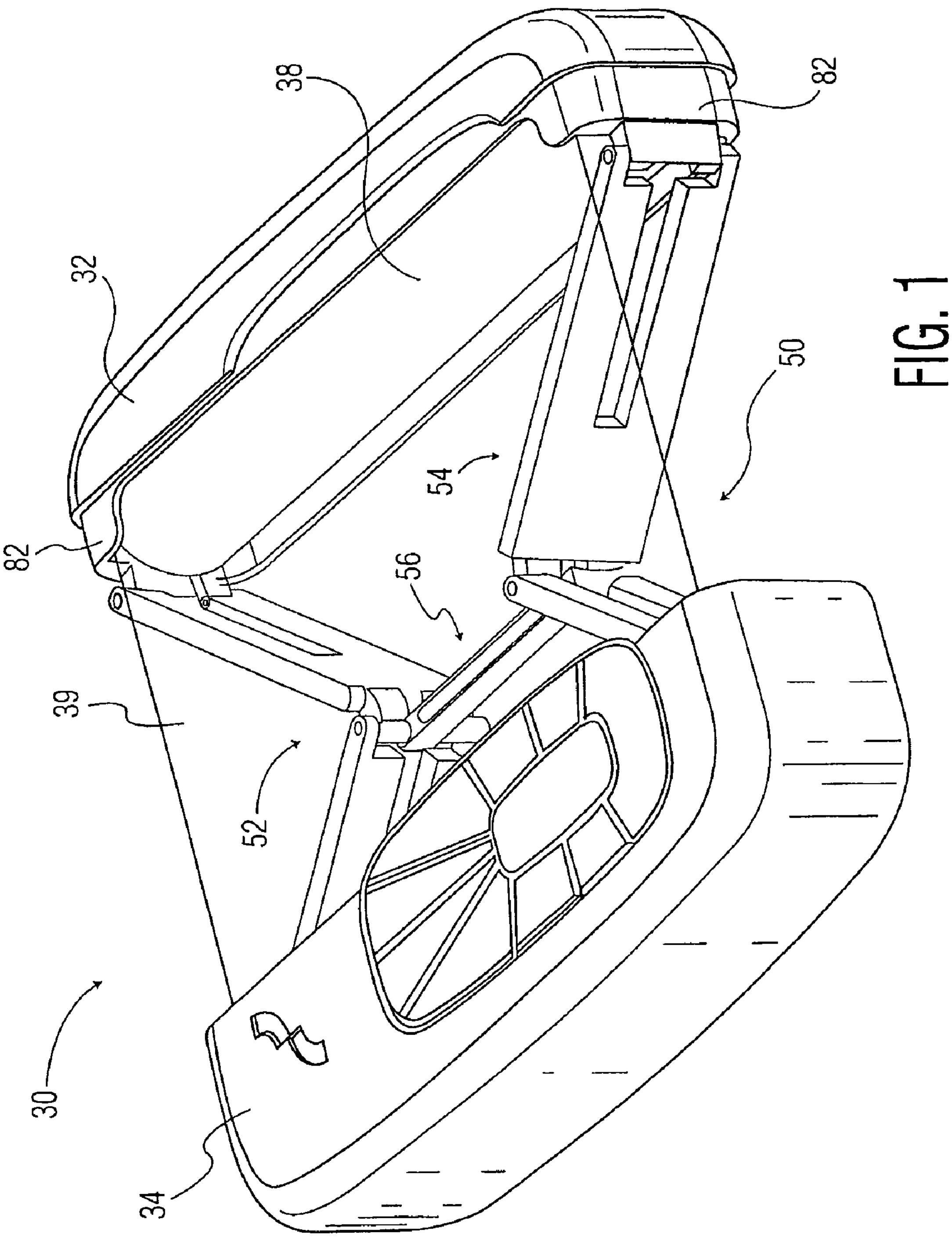
FIG. 1 is a perspective view in the extended configuration of a rollable display device made in accordance with the present invention.
Figure 2:
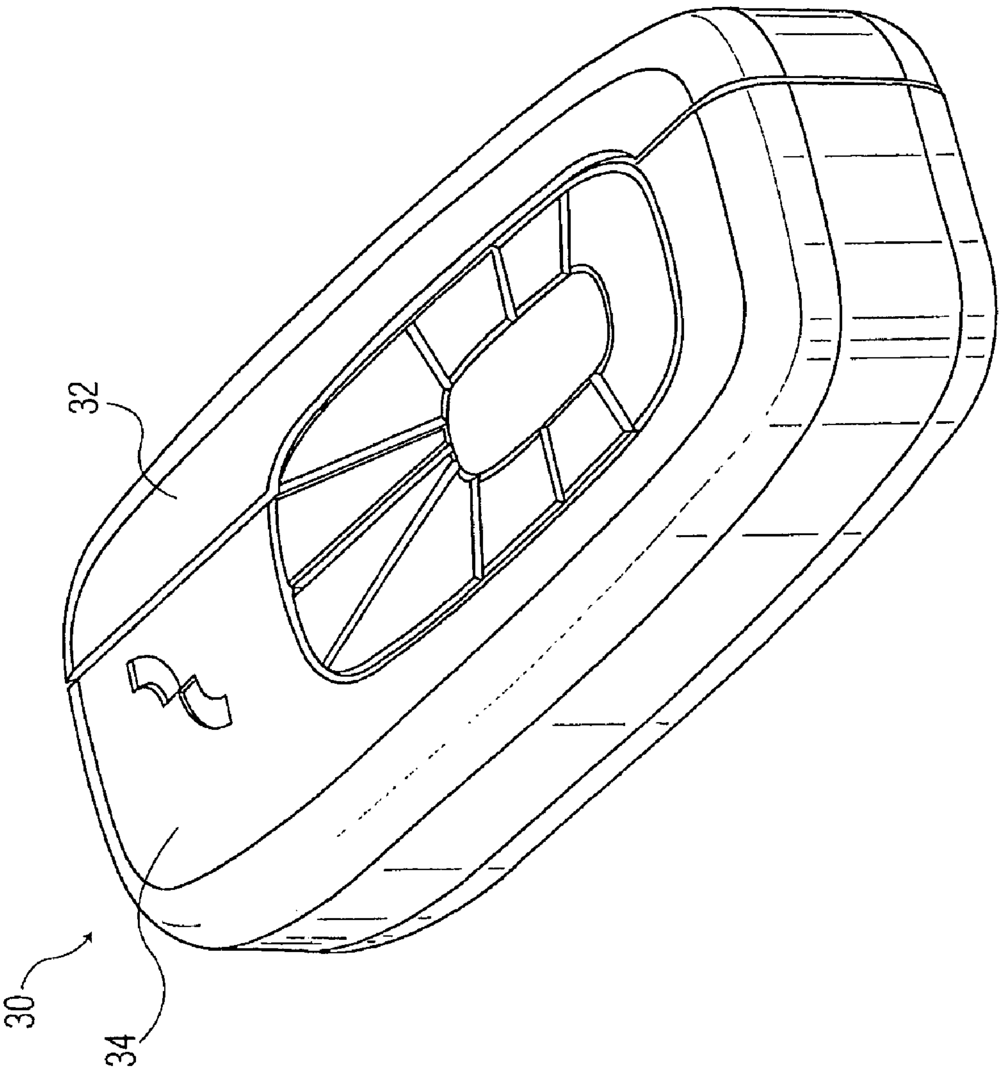
FIG. 2 is a perspective view in the rolled configuration of a rollable display device made in accordance with the present invention.

FIGS. 1-5, in which like elements share like reference numbers, are views of a rollable display device made in accordance with the present invention. Rollable display device 30 has an extended configuration as shown in FIG. 1 in which a rollable display 38 is rolled out to display information to the user, and has a rolled configuration as shown in FIG. 2 in which the rollable display 38 is rolled away within the housings for portability and protection. The viewing portion 39 of the rollable display 38 is maintained within a plane in the extended configuration to prevent twisting or bending of the rollable display 38. As used herein, the terms "extended" and "extended configuration" are defined as the configuration in which the housings of the rollable display device 30 are separated and the viewing portion 39 of the rollable display 38 is extended and visible to the user. The terms "rolled" and "rolled configuration" are defined as the configuration in which the housings of the rollable display device 30 are joined and the viewing portion 39 of the rollable display 38 is rolled for storage and not visible to the user. The rollable display device 30 can be any electronic device displaying information, such as a global positioning system (GPS) receiver, a mobile telephone, a personal digital assistant (PDA), an eBook reader, a photo viewer, an MP3 player, a news alert viewer, a streaming video viewer, a video teleconferencing device, a remote control, an entertainment program guide, or the like.

The rollable display device 30 includes a first housing 32, a second housing 34, an electronic package 36, a rollable display 38, and a spreader mechanism 50. The spreader mechanism 50 maintains the viewing portion 39 of the rollable display 38 in a planar configuration when the rollable display 38 is extended. The viewing portion 39 is shown as transparent for clarity of illustration, although the viewing portion 39 displays graphical information and can be opaque. The first housing 32 includes a roll frame 40 for supporting and retaining the rollable display 38. The first housing 32 and the second housing 34 are mateable and include a first space 42 and a second space 44, respectively. In the rolled configuration, the first space 42 and the second space 44 form a cavity within the housing accepting the rollable display 38. One end of the rollable display 38 is connected at the second housing 34. The rollable display 38 is operably connected to the electronic package 36 to display information from the electronic package 36. The end of the rollable display 38 can be physically connected to the second housing 34 and/or the electronic package 36. The electronic package 36 generating a graphical information signal and the rollable display 38 is responsive to the graphical information signal to display graphical information. The spreader mechanism 50 includes a first leg assembly 52 connected between the first housing 32 and the second housing 34, a second leg assembly 54 connected between the first housing 32 and the second housing 34, and a joining assembly 56 connected between the first leg assembly 52 and the second leg assembly 54.

The rollable display 38 can be any flexible rollable display able to display graphical information, such as electronic paper, an E ink display, a polymer vision display, an electrowetting display, a polymer light-emitting diode (PolyLED) display, an organic light-emitting diode (OLED) display, a stratified liquid crystal (LC) display, or the like. The rollable display 38 can include hardware, such as springs, spindles, bushings, electromotors, and the like, as required to install the rollable display 38 within the roll frame 40 and control the static and dynamic forces when rolling and unrolling the viewing portion 39 of the rollable display 38. The electronic package 36 can be any electronic package for a device such as a global positioning system (GPS) receiver, a mobile telephone, a personal digital assistant (PDA), Personal Computer an eBook reader, and the like an electronic package for a component of such a device.

Figure 3:
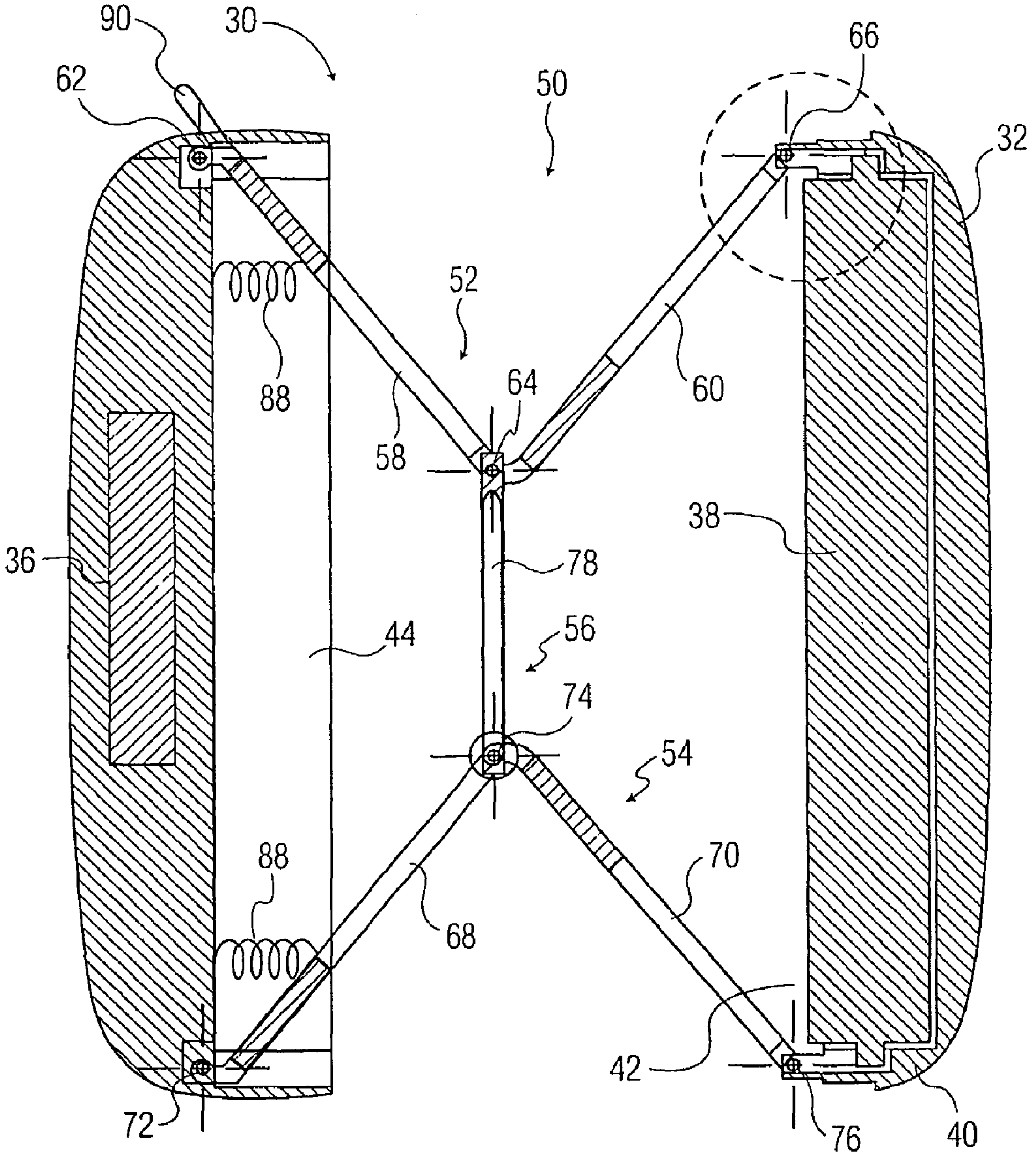
FIG. 3 is a front cross section view of a rollable display device made in accordance with the present invention.
Figure 4:
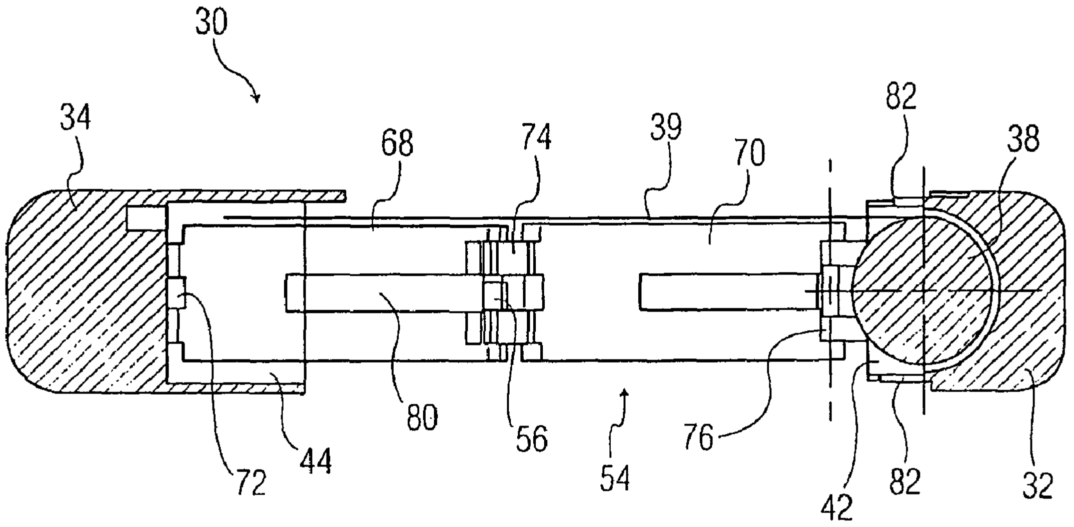
FIG. 4 is a transverse cross section view of a rollable display device made in accordance with the present invention.

Referring to FIGS. 3 & 4, the first leg assembly 52 includes a first leg 58 and a second leg 60. The first leg 58 is attached to the second housing 34 through knuckle-hinge joint 62 and to the second leg 60 through knuckle-hinge joint 64. The second leg 60 is attached to the first housing 32 through knuckle-hinge joint 66. Similarly, the second leg assembly 54 includes a third leg 68 and a fourth leg 70. The third leg 68 is attached to the second housing 34 through knuckle-hinge joint 72 and to the fourth leg 70 through knuckle-hinge joint 74. The fourth leg 70 is attached to the first housing 32 through knuckle-hinge joint 76. The joining assembly 56 has a groove 78 along its length. The joining assembly 56 is pivotably attached to the first leg assembly 52 through the pin of the knuckle-hinge joint 64. The joining assembly 56 is slidably attached to the second leg assembly 54 through location of the pin of the knuckle-hinge joint 74 in the groove 78. The joining assembly 56 is disposed in a slot 80 of the third leg 68 when the rollable display device 30 is in the rolled configuration. In an alternative embodiment, the fourth leg 70 can include the slot to receive the joining assembly 56 when the rollable display device 30 is in the rolled configuration.

Figure 5:
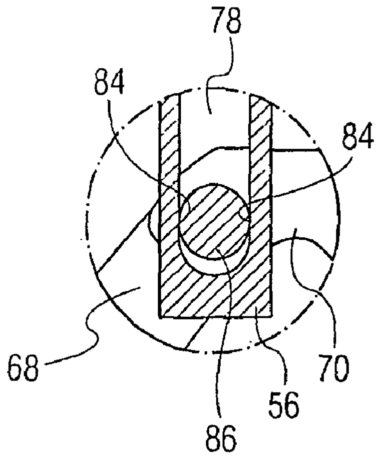
FIG. 5 is a detail view of a holding mechanism for a rollable display device made in accordance with the present invention.
Figure 6:
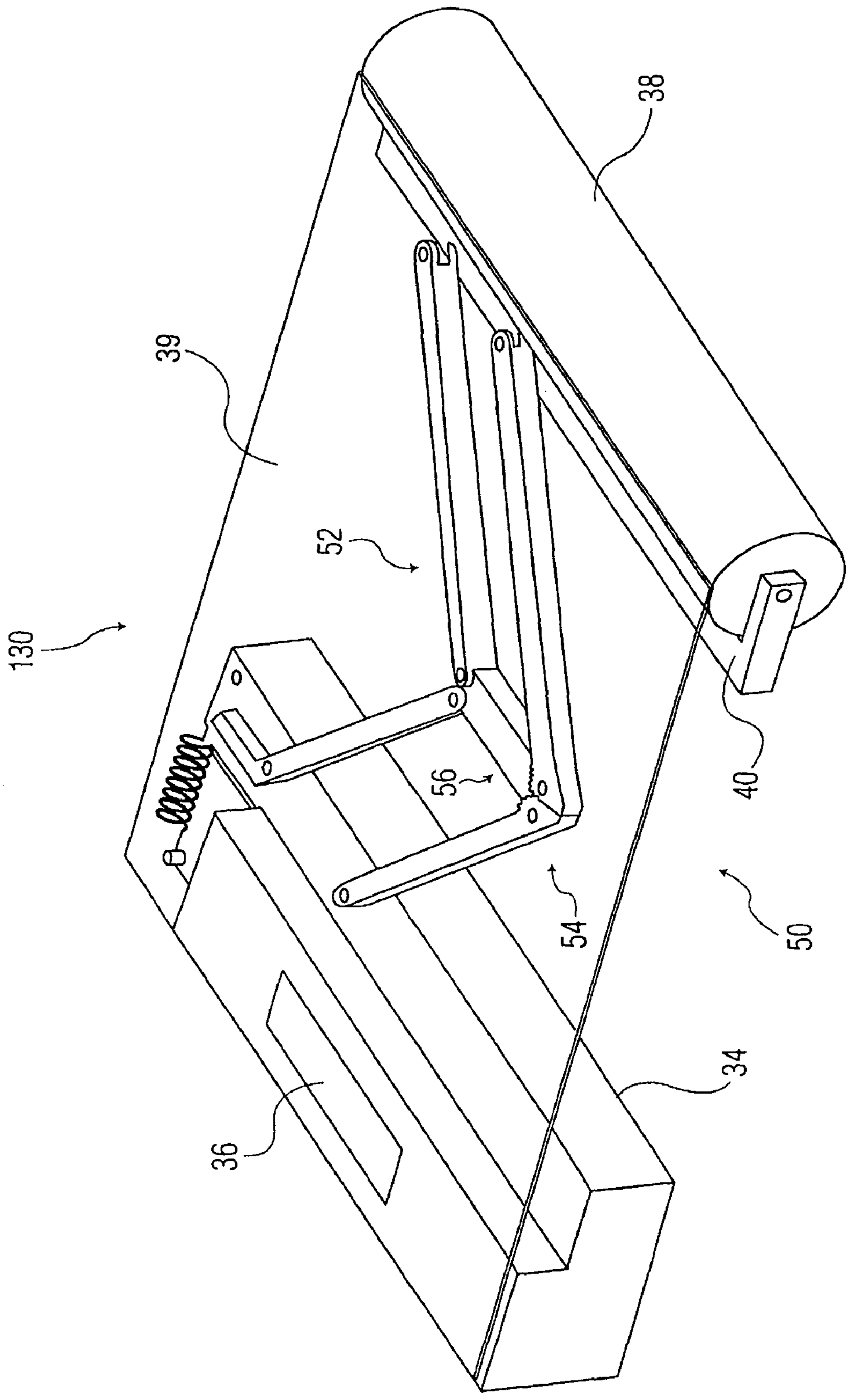
FIG. 6 is a perspective view in the extended configuration of an alternate embodiment of a rollable display device made in accordance with the present invention.

The use of the knuckle-hinge joints in this example of the rollable display device 30 maintains the rollable display 38 within a plane as the rollable display device 30 is in an intermediate configuration between the rolled configuration and the extended configuration, and when the rollable display 38 is in the extended configuration. In the rolled configuration, the first leg 58 and the second leg 60 are substantially parallel, as are the third leg 68 and the fourth leg 70. The joining assembly 56 is disposed in the slot 80 of the third leg 68. Those skilled in the art will appreciate that the legs can be considered substantially parallel as long as any angle between the legs does not restrict motion between the rolled configuration and the extended configuration. In one embodiment, the first housing 32 includes a mating surface 82 for coupling the first housing 32 and the second housing 34 when the rollable display device 30 is in the rolled configuration. In the extended configuration, the joining assembly 56 limits the travel of the first leg assembly 52 and the second leg assembly 54: the pin 86 of the knuckle-hinge joint 74 slides in the groove 78 of the joining assembly 56 until reaching the end of the groove 78. FIG. 5 shows detail of the pin at the end of the groove 78. In one embodiment, the joining assembly 56 includes one or more nubs 84 protruding into the groove 78 to act as a holding mechanism for the pin 86. The nubs 84 provide resistance to the travel of the pin 86 in the groove 78. Those skilled in the art will appreciate that the size and profile of the nubs 84 to provide the desired holding power, resistance magnitude, and/or directional dependant resistance.

Referring to FIG. 3, opening and closing forces can be selected to provide the desired opening and closing action. The rollable display 38 is typically spring loaded to roll the display and to hold the viewing portion of the rollable display 38 taut when the rollable display device 30 is in the extended configuration. The same spring loading urges the first housing 32 toward the second housing 34, providing a closing force. The opening force urging the first housing 32 away from the second housing 34 can be provided by various arrangements. In one embodiment, springs 88 are located between the legs and their associated housing, pushing the first leg 58 and the third leg 68 away from the second housing 34 in this example. Those skilled in the art will appreciate that many spring arrangements can be used to provide the opening and closing forces. For example, a spring in parallel with the joining assembly 56 between the first leg assembly 52 and the second leg assembly 54 can be used in compression to provide an opening force or used in tension to provide a closing force. Springs can be provided on the side of the legs 58, 68 opposite the springs 88 to provide a closing force. In another example, the springs can be located across the spreader mechanism 50, such as between the first leg 58 and the third leg 68, between the first leg 58 and the second leg 60, or the like. The various spring arrangements can be used individually or in combination to accomplish a particular result. The springs can be any spring able to provide a force, such as mechanical springs, pneumatic springs, or the like.

Scaling the opening and closing forces provides the desired opening and closing action. When the opening force exceeds the closing force, the first housing 32 and the second housing 34 spring apart from the rolled configuration to the extended configuration on release of a catch assembly (not shown) holding the first housing 32 and the second housing 34 together. To return to the rolled configuration, the first housing 32 and the second housing 34 can be pushed together until the catch engages. When the closing force exceeds the opening force, the first housing 32 and the second housing 34 spring together from the extended configuration to the rolled configuration on release of a catch assembly (not shown) holding the first housing 32 and the second housing 34 apart. To return to the extended configuration, the first housing 32 and the second housing 34 can be pulled apart until the catch engages.

When the forces are balanced so that the opening force is approximately equal to the closing force, the first housing 32 and the second housing 34 remain in their existing configuration until additional force is applied, i.e., the rollable display device 30 stays in a rolled, intermediate, or extended configuration indefinitely. Those skilled in the art will appreciate that forces can be considered approximately equal as long as any difference is on the order of frictional forces in the system, which depend on the particular mechanisms used, such as the bushings, bearings, and dampers. In one example, frictional forces can be about 0.1 to 0.5 Newtons when the closing force is about 1.0 Newtons. Balanced forces permit easy switching between the rolled and extended configurations by gently pulling or pushing the first and second housings 32, 34 to the desired configuration. Balanced forces also permit use of a single-handed control to move between the rolled and extended configurations. In the example of FIG. 3, the single-handed control is a lever extension 90 continuing the first leg 58 through the outside of the second housing 34. The user can hold the second housing 34 in one hand and pull the lever extension 90 away from the first housing 32 with a thumb to switch the rollable display device 30 from a rolled to an extended configuration. The user can hold the second housing 34 in one hand and push the lever extension 90 toward the first housing 32 with a thumb to switch the rollable display device 30 from an extended to a rolled configuration. The lever extension 90 is but one example of a single-handed control: many combinations of linkages, levers, and buttons can be used to apply the additional opening and closing forces to the balanced forces, switching between the rolled and extended configurations. In one embodiment, the single-handed control can actuate a switch to energize the electronic package 36 when the single-handed control is actuated to extend the rollable display 38 from the rolled configuration to the extended configuration.

Those skilled in the art will appreciate that the various parameters affecting the static and dynamic behavior of the rollable display device, such as spring forces, dampers, bearing friction, and the like, can be varied to achieve the desired opening and closing action. For example, a damper including two bushings can be installed between the rollable display 38 and the roll frame 40, with one bushing attached to each on the axis and a small grease-filled gap between the bushings. Electromotors can also be included to provide opening and closing forces.

FIGS. 6-9, in which like elements share like reference numbers with each other and with FIGS. 1-5, are views of an alternate embodiment of a rollable display device made in accordance with the present invention. Most of the first and second housings have been omitted in FIGS. 6-9, to more clearly show the spreader mechanism. The first housing is disposed about the rollable display and includes the roll frame and the second housing is disposed about the electronic package.

The rollable display device 130 includes a first housing (not shown) including a roll frame 40, a second housing 34 (partially shown) enclosing an electronic package 36, a rollable display 38, and a spreader mechanism 50. The spreader mechanism 50 maintains the viewing portion 39 of the rollable display 38 in a planar configuration when the rollable display 38 is extended. The viewing portion 39 is shown as transparent for clarity of illustration, although the viewing portion 39 displays graphical information and can be opaque. One end of the rollable display 38 is connected at the second housing 34 and operably connected to the electronic package 36 to display information from the electronic package 36. The end of the rollable display 38 can be physically connected to the second housing 34 and/or the electronic package 36. The spreader mechanism 50 includes a first leg assembly 52 connected between the roll frame 40 and the second housing 34, a second leg assembly 54 connected between the roll frame 40 and the second housing 34, and a joining assembly 56 connected between the first leg assembly 52 and the second leg assembly 54.

Figure 7:
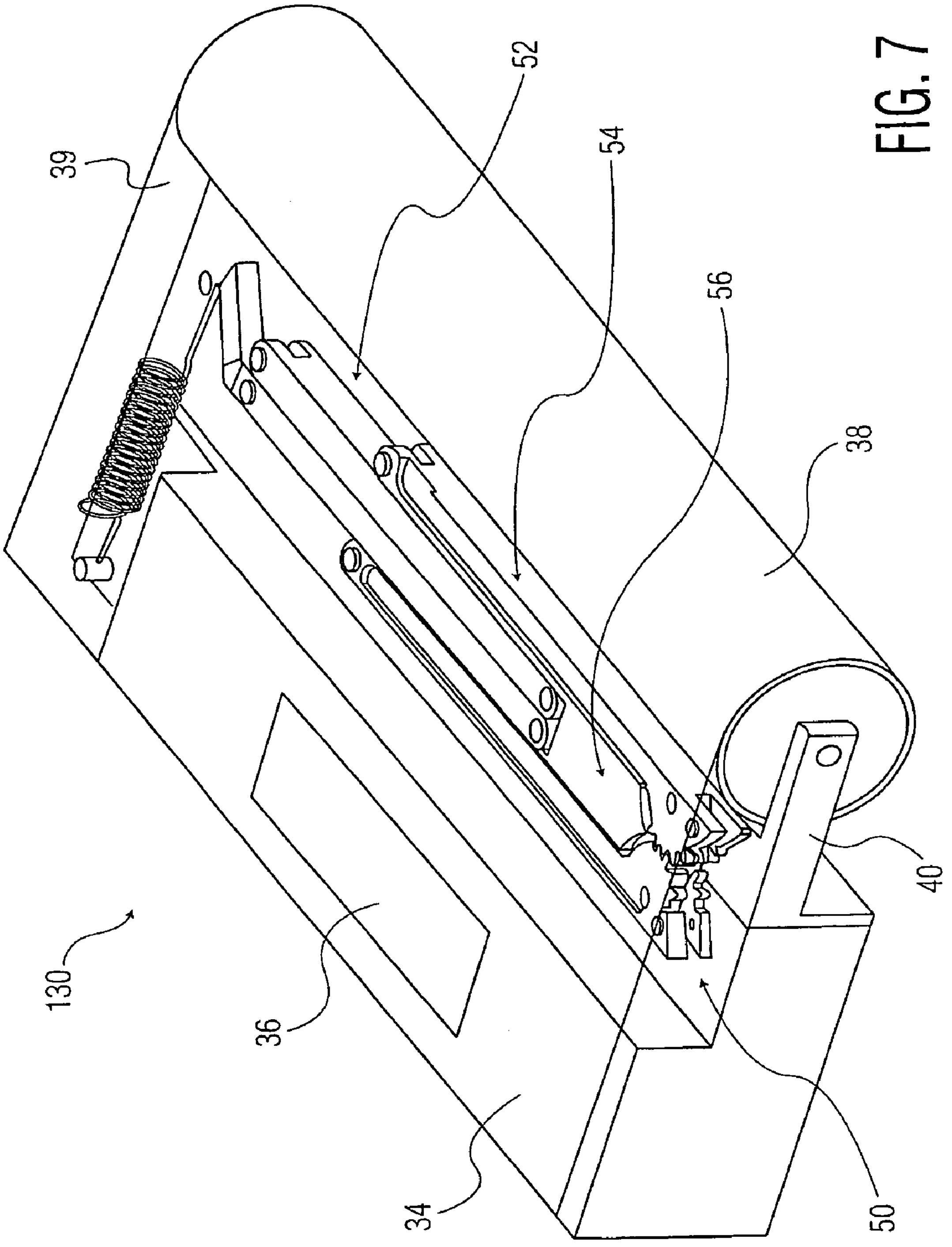
FIG. 7 is a perspective view in the rolled configuration of an alternate embodiment of a rollable display device made in accordance with the present invention.
Figure 8:
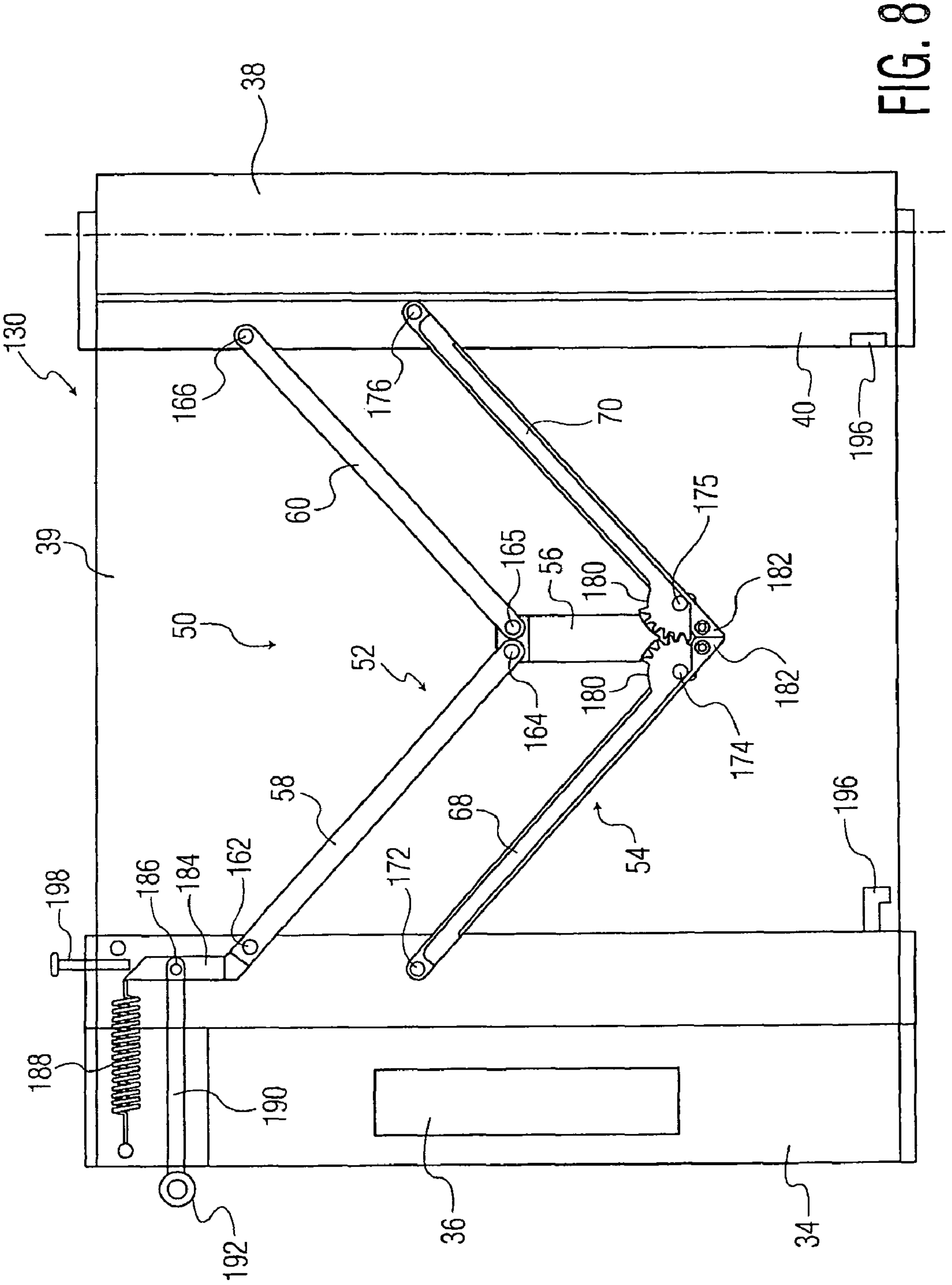
FIG. 8 is a front view of an alternate embodiment of a rollable display device made in accordance with the present invention.

Referring to FIGS. 7 & 8, the first leg assembly 52 includes a first leg 58 and a second leg 60. The first leg 58 is attached to the second housing 34 at pivot 162 and to the joining assembly 56 at pivot 164. The second leg 60 is attached to the joining assembly 56 at pivot 165 and to the roll frame 40 at pivot 166. Similarly, the second leg assembly 54 includes a third leg 68 and a fourth leg 70. The third leg 68 is attached to the second housing 34 at pivot 172 and to the joining assembly 56 at pivot 174. The fourth leg 70 is attached to the joining assembly 56 at pivot 175 and to the roll frame 40 at pivot 176.

The spreader mechanism 50 includes two connected four-bar mechanisms. The first four-bar mechanism includes the second leg 60, the roll frame 40, the fourth leg 70, and the joining assembly 56. The second four-bar mechanism includes the first leg 58, the joining assembly 56, the third leg 68, and the second housing 34. In one embodiment, the third leg 68 and the fourth leg 70 include engageable tooth wheels 180 about their respective pivots 174, 175, which maintain the angle between the third leg 68 and the joining assembly 56 equal to the angle between the fourth leg 70 and the joining assembly 56. This keeps the first leg 58 and the third leg 68, and the second leg 60 and the fourth leg 70, substantially parallel as the rollable display device 130 switches between the rolled configuration and the extended configuration. Those skilled in the art will appreciate that the legs can be considered substantially parallel as long as any angle between the legs does not restrict motion between the rolled configuration and the extended configuration. The two connected four-bar mechanisms and the tooth wheels 180 limit the degree of freedom to one: the roll direction perpendicular to the axis of the rollable display 38. The rollable display 38 is maintained within a plane as the rollable display device 130 is moving between the rolled configuration and the extended configuration, and when the rollable display 38 is in the extended configuration.

In one embodiment, the third leg 68 and the fourth leg 70 include angled stops 182, which meet and limit the travel in the extended configuration. Those skilled in the art will appreciate that the travel limit can be achieved with stops at different locations on the rollable display device 130 and with various mechanisms as desired.

Figure 9:
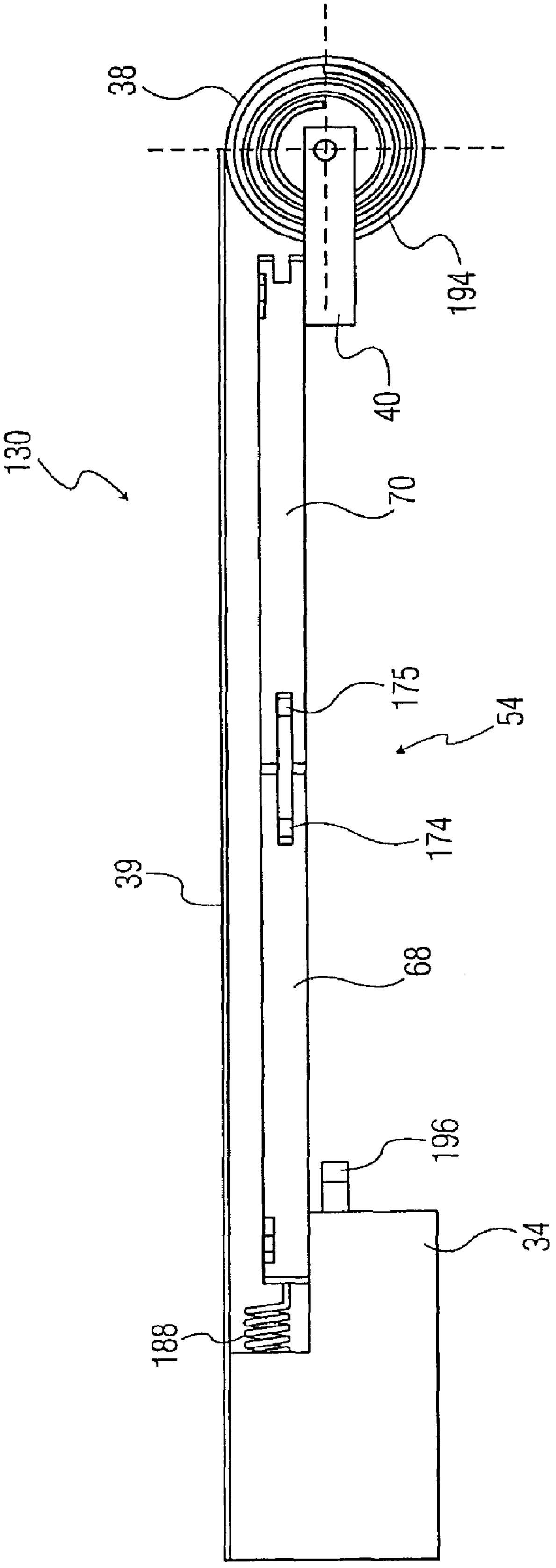
FIG. 9 is an end view of an alternate embodiment of a rollable display device made in accordance with the present invention.

Referring to FIG. 9, opening and closing forces can be selected to provide the desired opening and closing action. The rollable display 38 is typically spring loaded to roll the display and to hold the viewing portion of the rollable display 38 taut when the rollable display device 130 is in the extended configuration. The same spring loading urges the roll frame 40 toward the second housing 34, providing a closing force. Roller spring 194 is one example of a spring applying a closing force to urge the rollable display 38 toward a rolled configuration. Referring to FIG. 8, the opening force urging the roll frame 40 away from the second housing 34 can be provided by various arrangements. In one embodiment, spring 188 is attached between the second housing 34 and extension 184, which is attached to the first leg 58. The spring 188 urges the extension 184 toward the second housing 34, and provides the opening force through the first leg 58 about the pivot 162 to urge the roll frame 40 away from the second housing 34. Those skilled in the art will appreciate that many spring arrangements can be used to provide the opening and closing forces. For example, springs can be mounted in tension or compression between adjacent legs, e.g., between the first leg 58 and the third leg 68, or between the first leg 58 and the second leg 60, to provide opening or closing forces as desired. The various spring arrangements can be used individually or in combination to accomplish a particular result. The springs can be any spring able to provide a force, such as mechanical springs, pneumatic springs, or the like.

Scaling the opening and closing forces provides the desired opening and closing action. When the opening force exceeds the closing force, the first housing 32 and the second housing 34 spring apart from the rolled configuration to the extended configuration on release of a catch assembly 196 holding the first housing 32 and the second housing 34 together. To return to the rolled configuration, the first housing 32 and the second housing 34 can be pushed together until the catch assembly 196 engages. When the closing force exceeds the opening force, the first housing 32 and the second housing 34 spring together from the extended configuration to the rolled configuration on release of a catch assembly 198 holding the first housing 32 and the second housing 34 apart. In this example, the catch assembly 198 engages the extension 184. To return to the extended configuration, the first housing 32 and the second housing 34 can be pulled apart until the catch assembly 198 engages the extension 184. When the forces are balanced so that the opening force is about equal to the closing force, the first housing and the second housing remain in their present configuration until additional force is applied, i.e., the rollable display device 130 will stay in a rolled, intermediate, or extended configuration. Balanced forces permit easy switching between the rolled and extended configurations by gently pulling or pushing the first and second housings to the desired configuration.

Balanced forces also permit use of a single-handed control to move between the rolled and extended configurations. In the example of FIG. 7, the single-handed control is a link 190 with a ring 192 pivotably attached to the extension 184 at pivot 186. The ring 192 extends outside of the housing. The user can hold the housing in one hand and push the ring 192 with a thumb to switch the rollable display device 130 from a rolled to an extended configuration. The user can hold the second housing 34 in one hand and pull the ring 192 with a thumb to switch the rollable display device 130 from an extended to a rolled configuration. The link 190 is but one example of a single-handed control: many combinations of linkages, levers, and buttons can be used to apply the additional opening and closing forces to the balanced forces, switching between the rolled and extended configurations. Those skilled in the art will appreciate that the various parameters affecting the static and dynamic behavior of the rollable display device, such as spring forces, dampers, bearing friction, and the like, can be varied to achieve the desired opening and closing action. Electromotors can also be included to provide opening and closing forces.

Figure 10:
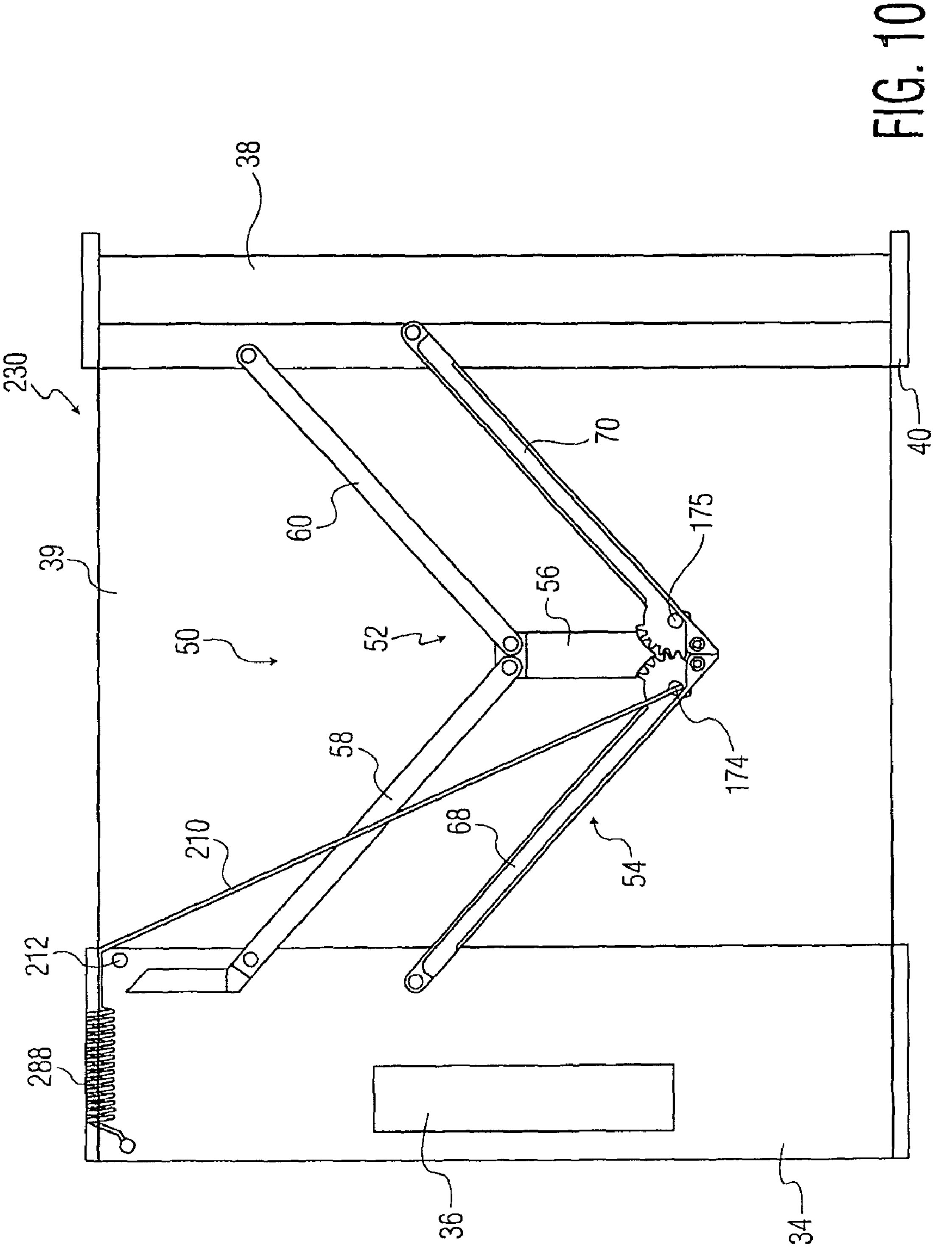
FIG. 10 is a front view of another alternate embodiment of a rollable display device made in accordance with the present invention.

FIG. 10, in which like elements share like reference numbers with FIG. 8, is a front view of another alternate embodiment of a rollable display device made in accordance with the present invention. Most of the first and second housings have been omitted in FIG. 10, to more clearly show the spreader mechanism. The first housing is disposed about the rollable display and includes the roll frame and the second housing is disposed about the electronic package. This example provides non-linear forces between the rolled and extended configurations, in this case resulting in an unstable equilibrium point when the rollable display device 230 is between the rolled and extended configurations. The opening and closing forces are equal for one portion of travel and unequal for another portion of travel.

A spring 288 connected to the second housing 34 is also connected to cable 210, which passes over post 212 and terminates at pivot 174. When the rollable display device 230 is in the rolled configuration, the cable 210 is aligned with the legs 58, 60, 68, 70. In an intermediate configuration between the rolled and extended configurations, the cable 210 is no longer aligned with the legs, so that the spring 288 provides an opening force. Until the rollable display device 230 is open to the unstable equilibrium point, the rollable display device 230 closes to the rolled configuration when released. When the opening force is equal to the closing force from the spring-loaded rollable display 38, the rollable display device 230 is in the unstable equilibrium point. When the rollable display device 230 is open between the unstable equilibrium point and the extended configuration, the rollable display device 230 opens to the extended configuration when released. Those skilled in the art will appreciate that many non-linear combinations providing different unstable equilibrium points and forces can be accomplished by selecting the particular spring forces and cable routing and connection points. Various parameters affecting the static and dynamic behavior of the rollable display device, such as spring forces, dampers, bearing friction, and the like, can be varied to achieve the desired opening and closing action. Electromotors can also be included to provide opening and closing forces.

Figure 11:
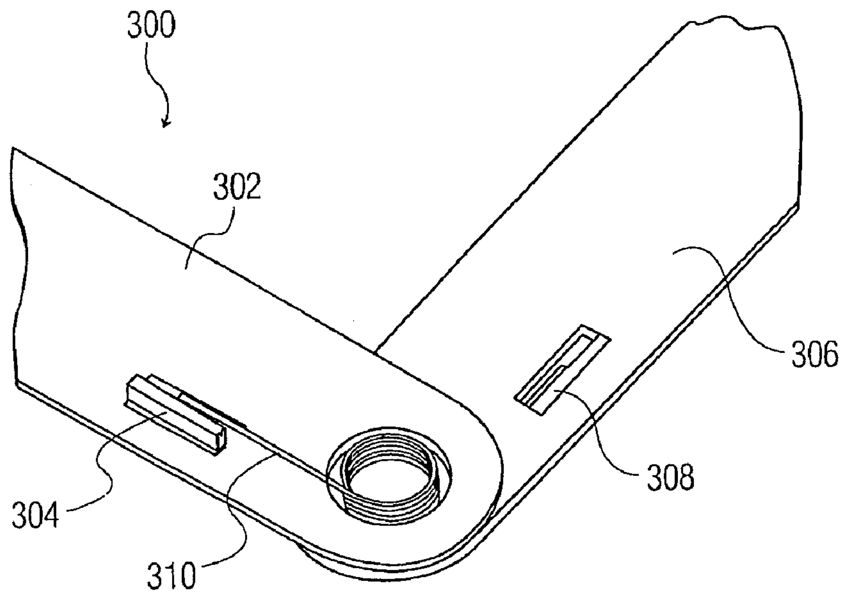
FIG. 11 is a detail perspective view of an alternate spring arrangement of a rollable display device made in accordance with the present invention.

FIG. 11 is a detail perspective view of an alternate spring arrangement of a rollable display device made in accordance with the present invention. The spring arrangement 300 can be used in any joint or pivot point of the rollable display device to apply an opening or closing force as desired for a particular design. In the example shown, the spring arrangement 300 includes a first stop 304 operably connected to a first leg 302 and a second stop 308 operably connected to a second leg 306. A preloaded torsional spring 310 is sprung between the first stop 304 and the second stop 308 to urge open the angle between the first leg 302 and the second leg 306. In one embodiment, a coil of the preloaded torsional spring 310 encircles the pin or pivot of the joint connecting the first leg 302 and the second leg 306. Those skilled in the art will appreciate that the spring arrangement 300 can be modified to urge closed the angle between the first leg 302 and the second leg 306 by switching the spring relative to the stops and the direction of the spring preloading. The spring arrangement 300 can be used at any joint or pivot point, where leg attaches to leg, leg to housing, or leg to joining assembly.

Figure 12:
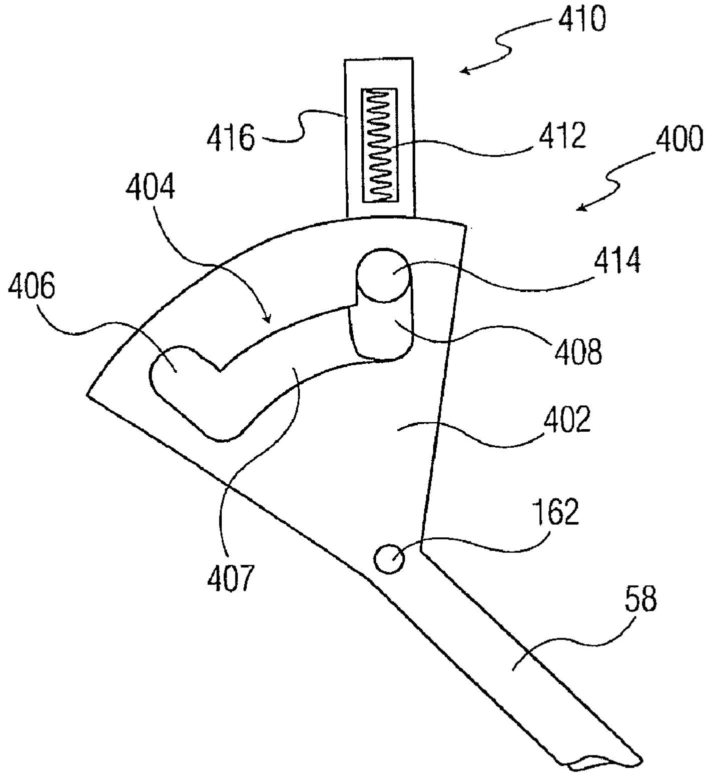
FIG. 12 is a detail front view of an alternate catch assembly of a rollable display device made in accordance with the present invention.

FIG. 12, in which like elements share like reference numbers with FIG. 8, is a detail front view of an alternate catch assembly of a rollable display device made in accordance with the present invention. In the example shown, the catch assembly 400 provides two lock positions for the rollable display device, such as lock positions for the rolled configuration and the extended configuration. The catch assembly 400 includes an extension 402 having a profiled groove 404. The profiled groove 404 includes a first recess 406, connecting opening 407, and a second recess 408. Catch 410 includes a link 416 with a spring 412 urging a lockpin 414 toward the recesses. When the user depresses the link 416, directly or through additional linkage, the lockpin 414 moves from the second recess 408 into the connecting opening 407. Depending on the balance of the opening and closing forces in the rollable display device, the rollable display device moves or can be moved to the alternative configuration corresponding to the second locked position. When the lockpin 414 reaches the first recess 406, the lockpin 414 engages the first recess 406 to lock into the second locked position. The procedure can be reversed to return from the second locked position to the original first locked position. Those skilled in the art will appreciate that one of the two recesses can be omitted when locking in one position, rather than locking in two positions, is desired. Similarly, additional recesses between the first and second recesses can be provided for locking in additional intermediate positions. Those skilled in the art will appreciate that the spreader mechanism 50 is not limited to mechanical linkages. For example, the first leg assembly 52 and the second leg assembly 54 can be inflatable struts which are inflated when the rollable display device 30 is in the extended configuration and deflated when the rollable display device 30 is in the rolled configuration. In one embodiment, the inflatable struts can be incorporated in the viewing portion 39 of the rollable display 38.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. A rollable display device comprising:

a first housing 32;

a second housing 34, the second housing 34 being mateable with the first housing 32;

an electronic package 36, the electronic package 36 being disposed within at least one of the first housing and the second housing 34;

a roll frame 40, the roll frame 40 being coupled to the first housing 32;

a rollable display 38, the rollable display 38 being rotatably disposed within the roll frame 40, having one end connected at the second housing 34, and being operably connected to the electronic package 36 to display information from the electronic package 36; and a spreader mechanism 50, the spreader mechanism 50 having a first leg assembly 52, a second leg assembly 54, and a joining assembly 56;

wherein the first leg assembly 52 couples the first housing 32 and the second housing 34, the second leg assembly 54 couples the first housing 32 and the second housing 34, and the joining assembly 56 couples the first leg assembly 52 and the second leg assembly 54.

2. The device of claim 1 wherein the first leg assembly 52 comprises a first leg 58 and a second leg 60 coupled by a first knuckle-hinge joint 64, the second leg assembly 54 comprises a third leg 68 and a fourth leg 70 coupled by a second knuckle-hinge joint 74, and the joining assembly 56 is coupled to the first leg assembly 52 by the first knuckle-hinge joint 64 and is coupled to the second leg assembly 54 by the second knuckle-hinge joint 74.

3. The device of claim 2 wherein the joining assembly 56 has a groove 78, and the second knuckle-hinge joint 74 has a pin 86 slidably disposed in the groove 78.

4. The device of claim 3 wherein the groove 78 has a nub 84 near an end of the groove 78 opposite the first knuckle-hinge joint 64, the nub 84 holding the pin 86 when the rollable display 38 is extended.

5. The device of claim 3 wherein one of the third leg 68 and the fourth leg 70 has a slot 80 receiving the joining assembly 56 when the rollable display 38 is rolled.

6. The device of claim 1 wherein the first leg assembly 52 comprises a first leg 58 and a second leg 60, the second leg assembly 54 comprises a third leg 68 and a fourth leg 70, the first leg 58 is substantially parallel the third leg 68, and the second leg 60 is substantially parallel the fourth leg 70.

7. The device of claim 6 wherein the third leg 68 is coupled to the joining assembly 56 at a first pivot 174, the fourth leg 70 coupled to the joining assembly 56 at a second pivot 175, the third leg 68 has a first tooth wheel 180 disposed about the first pivot 174, and the fourth leg 70 has a second tooth wheel 180 disposed about the second pivot 175, the first tooth wheel 180 being engaged with the second tooth wheel 180.

8. The device of claim 6 wherein the third leg 68 is coupled to the joining assembly 56 at a first pivot 174, the fourth leg 70 is coupled to the joining assembly 56 at a second pivot 175, the third leg 68 has a first angled stop 182 disposed about the first pivot 174, the fourth leg 70 has a second angled stop 182 disposed about the second pivot 175, and the first angled stop 182 engages the second angled stop 182 when the rollable display 38 is extended.

9. The device of claim 6 wherein the first leg 58 is coupled to the second housing 34 at a pivot 162 and the first leg 58 has an extension 184 rotatable about the pivot 162, further comprising a spring 188 operably connected between the extension 184 and the second housing 34 to urge the rollable display 38 toward an extended configuration.

10. The device of claim 1 wherein the rollable display 38 has a roller spring 194 to apply a closing force to urge the rollable display 38 toward a rolled configuration.

11. The device of claim 10 further comprising at least one spring operably connected to the spreader mechanism 50 to apply an opening force to urge the rollable display 38 toward a rolled configuration.

12. The device of claim 10 further comprising at least one spring operably connected the spreader mechanism 50 to apply an opening force to urge the rollable display 38 toward an extended configuration.

13. The device of claim 12 wherein the at least one spring is connected to the spreader mechanism 50 at a location selected from the group consisting of a location across the spreader mechanism 50, and a location between the spreader mechanism 50 and at least one of the first housing 32 and the second housing 34.

14. The device of claim 12 wherein the opening force is greater than the closing force.

15. The device of claim 14 further comprising a catch assembly 196 operably connected between the first housing 32 and the second housing 34, the catch assembly 196 maintaining the rollable display 38 in the rolled configuration when the catch assembly 196 is engaged.

16. The device of claim 12 wherein the opening force is less than the closing force.

17. The device of claim 16 further comprising a catch assembly 198 operably connected to the spreader mechanism 50, the catch assembly 198 maintaining the rollable display 38 in the extended configuration when the catch assembly 198 is engaged.

18. The device of claim 12 wherein the opening force is approximately equal to the closing force.

19. The device of claim 18 further comprising a single-handed control operably connected to the spreader mechanism 50.

20. The device of claim 19 wherein the electronic package 36 is energized in response to actuation of the single-handed control to extend the rollable display 38 from the rolled configuration.

21. The device of claim 12 wherein the opening force and the closing force are approximately equal for a first travel portion, and the opening force and the closing force are unequal for a second travel portion.

22. The device of claim 1 wherein the electronic package 36 is an electronics package for a device selected from the group of consisting of a global positioning system (GPS) receiver, a mobile telephone, a personal digital assistant (PDA), an eBook reader, a photo viewer, an MP3 player, a news alert viewer, a streaming video viewer, a video teleconferencing device, a remote control, and an entertainment program guide.

23. A rollable display device comprising:
- a first housing 32;
- a second housing 34, the second housing 34 being mateable with the first housing 32;
- an electronic package 36, the electronic package 36 being disposed within at least one of the first housing and the second housing 34;
- a roll frame 40, the roll frame 40 being coupled to the first housing 32;
- a rollable display 38, the rollable display 38 being rotatably disposed within the roll frame 40 and having one end connected at the second housing 34, and being operably connected to the electronic package 36 to display information from the electronic package 36; and
- a spreader mechanism 50, the spreader mechanism 50 having a first four-bar mechanism and a second four-bar mechanism;

wherein the first four-bar mechanism is coupled to the first housing 32 and a joining assembly 56, and the second four-bar mechanism is coupled to the second housing 34 and the joining assembly 56.

24. The device of claim 23 wherein the first four-bar mechanism is operably connected to the second four-bar mechanism through toothed wheels 180.

25. The device of claim 23 wherein the rollable display 38 is spring loaded to apply a closing force urging the rollable display 38 toward a rolled configuration, and further comprising a spring 288 coupled to the spreader mechanism 50 with a cable 210 to apply an opening force, the opening force and the closing force being approximately equal for a first travel portion, and the opening force and the closing force being unequal for a second travel portion.

26. A rollable display device comprising:
- a first housing 32;
- a second housing 34, the second housing 34 being mateable with the first housing 32;
- means for generating a graphical information signal;
- rollable means for displaying graphical information responsive to the graphical information signal, the rollable displaying means providing a closing force between the first housing 32 and the second housing 34; and
- means for spreading the first housing 32 and the second housing 34.

27. The device of claim 26 wherein the spreading means further comprises means for providing an opening force between the first housing 32 and the second housing 34.

28. The device of claim 27 further comprising means for equalizing the closing force and the opening force.

29. The device of claim 26 further comprising means for locking the rollable displaying means in a rolled configuration.

30. The device of claim 26 further comprising means for locking the rollable displaying means in an extended configuration.

31. The device of claim 26 further comprising means for controlling extension of the rollable displaying means with a single hand.

32. The device of claim 26 further comprising means for establishing dynamic behavior of the rollable displaying means between a rolled configuration and an extended configuration.

* * * * *